(12) United States Patent
Lee et al.

(10) Patent No.: US 9,219,909 B2
(45) Date of Patent: Dec. 22, 2015

(54) THREE DIMENSIONAL IMAGE DISPLAY DEVICE HAVING 2D AND 3D MODES AND DRIVING METHOD THEREOF

(75) Inventors: Jun Pyo Lee, Asan-si (KR); Bong Im Park, Asan-si (KR); Ik Hyun Ahn, Gyeonggi-do (KR); Ho Seok Son, Incheon (KR); Jung-Won Kim, Seoul (KR); Se Huhn Hur, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 432 days.

(21) Appl. No.: 13/359,896

(22) Filed: Jan. 27, 2012

(65) Prior Publication Data

US 2013/0002653 A1    Jan. 3, 2013

(30) Foreign Application Priority Data

Jun. 29, 2011    (KR) ........................ 10-2011-0063824

(51) Int. Cl.
*G09G 3/36* (2006.01)
*H04N 13/04* (2006.01)
*G09G 3/34* (2006.01)

(52) U.S. Cl.
CPC ........... *H04N 13/0438* (2013.01); *G09G 3/342* (2013.01); *G09G 3/3648* (2013.01); *H04N 13/0454* (2013.01); *G09G 3/3614* (2013.01); *G09G 2310/024* (2013.01); *G09G 2310/0205* (2013.01); *G09G 2310/061* (2013.01)

(58) Field of Classification Search
CPC .... G09G 3/342; G09G 3/3658; G09G 3/3614
See application file for complete search history.

(56) References Cited

U.S. PATENT DOCUMENTS

| | | | |
|---|---|---|---|
| 6,407,729 B1 * | 6/2002 | Moon | 345/99 |
| 2006/0197716 A1 | 9/2006 | Tanaka et al. | |
| 2008/0158125 A1 * | 7/2008 | Mori et al. | 345/92 |
| 2008/0284801 A1 | 11/2008 | Brigham et al. | |
| 2010/0165079 A1 | 7/2010 | Yamada | |
| 2010/0253678 A1 | 10/2010 | Choi et al. | |
| 2010/0309381 A1 * | 12/2010 | Nakagawa et al. | 348/705 |
| 2011/0050870 A1 * | 3/2011 | Hanari | 348/56 |

(Continued)

FOREIGN PATENT DOCUMENTS

| | | |
|---|---|---|
| CN | 101650922 | 2/2010 |
| CN | 102034448 | 4/2011 |

(Continued)

OTHER PUBLICATIONS

Extended European Search Report Dated Mar. 7, 2013.

(Continued)

*Primary Examiner* — Ryan A Lubit
*Assistant Examiner* — Lisa Landis
(74) *Attorney, Agent, or Firm* — F. Chau & Associates, LLC

(57) ABSTRACT

In a 3D image display device and a driving method thereof, a left-eye image and a right-eye image are displayed at a 3D display frequency higher than a 2D display frequency in a 3D mode. The left-eye image or the right-eye image is applied to a data line as data voltages having the same polarity and the same magnitude throughout at least two consecutive frames. A gate-on voltage is applied to a plurality of gate lines crossing the data line sequentially at an interval of a compensation gate-on application time calculated based on a total data delay value.

51 Claims, 8 Drawing Sheets

(56) References Cited

U.S. PATENT DOCUMENTS

| | | |
|---|---|---|
| 2011/0058024 A1 | 3/2011 | Choi et al. |
| 2011/0074938 A1* | 3/2011 | Nakahata .................. 348/56 |
| 2011/0102422 A1* | 5/2011 | Park et al. ................ 345/419 |
| 2011/0205335 A1* | 8/2011 | Kim et al. ................. 348/43 |
| 2011/0279466 A1 | 11/2011 | Park et al. |
| 2011/0310090 A1 | 12/2011 | Kim et al. |
| 2012/0038690 A1* | 2/2012 | Lee .......................... 345/691 |
| 2012/0068999 A1 | 3/2012 | Yoo et al. |
| 2012/0127162 A1 | 5/2012 | Park et al. |

FOREIGN PATENT DOCUMENTS

| | | |
|---|---|---|
| CN | 102779496 | 11/2012 |
| EP | 2 306 743 A2 | 4/2011 |
| EP | 2306743 A2 * | 4/2011 |
| JP | 2000242241 | 9/2000 |
| JP | 2007-322626 | 12/2007 |
| JP | 2009-031523 | 2/2009 |
| JP | 2010-091782 | 4/2010 |
| JP | 2010-276965 | 12/2010 |
| JP | 2011053554 | 3/2011 |
| JP | 2306743 * | 4/2011 |
| JP | 2011075746 | 4/2011 |
| JP | 2011118302 | 6/2011 |
| KR | 10-2006-0093610 | 8/2006 |
| KR | 10-0859694 | 9/2008 |
| KR | 10-2009-0033624 | 4/2009 |
| KR | 10-2010-0000585 | 1/2010 |
| KR | 10-2010-0111082 | 10/2010 |
| KR | 10-2010-0128019 | 12/2010 |

OTHER PUBLICATIONS

European Search Report Dated Oct. 19, 2012.
English Abstract for Publication No. 10-006-0093610.
English Abstract for Publication No. 2007-322626.
English Abstract for Publication No. 10-0859694.
English Abstract for Publication No. 2009-031523.
English Abstract for Publication No. 10-2009-0033624.
English Abstract for Publication No. 10-2010-0000585.
English Abstract for Publication No. 2010-091782.
English Abstract for Publication No. 10-2010-0111082.
English Abstract for Publication No. 10-2010-0128019.
English Abstract for Publication No. 2010-276965.

* cited by examiner

THREE DIMENSIONAL IMAGE DISPLAY DEVICE HAVING 2D AND 3D MODES AND DRIVING METHOD THEREOF

CROSS-REFERENCE TO RELATED APPLICATION

This application claims priority to and the benefit of Korean Patent Application No. 10-2011-0063824 filed in the Korean Intellectual Property Office on Jun. 29, 2011, the entire contents of which are incorporated herein by reference.

BACKGROUND (a) Technical Field

The present invention relates to a display device, and more particularly, to a three-dimensional image display device and a driving method thereof.

(b) Discussion of the Related Art

Modern devices allow users to consume multimedia content which may be reproduced from a media or received over high-speed networks such as cable lines or the Internet. This multimedia content may include audio and video content, which may be accurately reproduced for the benefit of the user. The video content may be three-dimensional (3D) video.

In general, 3D images may be reproduced according to a principle of a stereo vision. Stereo vision is the process by which the left-eye and the right-eye of the user perceive a given scene differently. Ordinarily, people are naturally able to perceive three-dimensionality because of the separation between the left and right eyes. This separation, which is approximately 65 mm, permits the left and right eyes to see a given scene from two slightly different angles. The human brain is then able to process the distinct left-eye and right-eye images to provide a sense of depth. The ability is called stereography.

Display devices specially designed for the display of 3D video may be able to recreate the effect of stereography by providing distinct images to the left and right eye of the viewer. The distinct images may be specially formulated to resemble binocular disparity. There are several different types of 3D displays currently in use. Each type of 3D display uses a distinct method for delivering the correct image to the correct eye. Stereoscopic polarization-type displays will project the two different images using orthogonally polarized light. The user would then wear orthogonally polarized glasses to filter out the undesirable image from the corresponding eyes. Time division-type displays will project the corresponding images at different times, for example, at every other frame, and active-shutter glasses worn by the user may synchronize with the display to block the undesired image from the corresponding eye.

Other display types do not require that the user wear 3D glasses. These forms of 3D display are called autostereoscopic. One type of autostereoscopic display is the parallax barrier display. This display uses a specially placed set of columns to prevent the left eye from seeing certain columns of display pixels and to prevent the right eye from seeing certain other columns of display pixels. The left-eye image is then displayed on those columns perceivable to the user's left eye and the right-eye image is then displayed on those columns perceivable to the user's right eye.

SUMMARY

Exemplary embodiments of the present invention provide a 3D image display device and a driving method thereof for accurately displaying a desired gray level by providing a voltage to a liquid crystal layer using high-speed driving. An additional panel structure is not changed and luminance is prevented from being deteriorated.

An exemplary embodiment of the present invention provides a driving method of a 3D image display device, including judging whether a 2D mode or a 3D mode is implemented. An image is displayed at a set 2D frequency when it is judged that the 2D mode is implemented. A left-eye image and a right-eye image are displayed at a 3D frequency that is higher than the 2D frequency when it is judged that the 3D mode is implemented. The displaying of the left-eye image and the right-eye image includes applying the left-eye image or the right-eye image to a data line as data voltages having the same polarity and the same magnitude throughout at least two consecutive frames. A gate-on voltage is applied to a plurality of gate lines that cross the data line sequentially for a compensation gate-on application time calculated based on a total data delay value.

The compensation gate-on application time may be acquired by adding a reference data delay value which is acquired by dividing the total data delay value by the total number of the plurality of gate lines, to one horizontal period 1 H.

When the number of frames in which the left-eye image or the right-eye image is consecutively applied is x, a margin may be provided and a time acquired by multiplying a time acquired by subtracting a total gate delay value from an effective charge time by x in the 3D mode is larger than a time acquired by subtracting the total gate delay value from the effective charge time in the 2D mode.

The 3D frequency may be 1.5 to four times higher than the 2D frequency.

A 3D image signal group including the left-eye image and the right-eye image may be divided into a left-eye image group and a right-eye image group. A black image may be included in a last frame of the left-eye image group and a last frame of the right-eye image group.

The gate-on voltage may be applied for a time which is twice as long as a time in which the gate-on voltage is applied in the frame in which the left-eye image and the right-eye image may be applied. The gate-on voltage may be applied in the frame in which the black image is applied.

The 3D image display device may include a signal processor, a data driver, a gate driver, a liquid crystal display panel, a backlight positioned on a rear surface of the liquid crystal display panel, and 3D glasses. The displaying of the left-eye image and the right-eye image may further include generating image data by rearranging input image data inputted into the signal processor to be suitable for the 3D frequency and outputting the generated image data to the data driver.

The left-eye image and the right-eye image may be rearranged as any one of LLLRRR, LLBRRB, LLLLRRRR, and LLLBRRRB, where L represents the left-eye image, R represents the right-eye image, and B represents the black image.

The signal processor may perform dynamic capacitance compensation (DCC) processing of the inputted input image data in addition to the rearrangement processing and thereafter, generate the image data.

The 3D image display device may include a liquid crystal display panel and a backlight positioned on a rear surface of the liquid crystal display panel. The displaying of the left-eye image and the right-eye image may further include dividing the liquid crystal display panel into a plurality of blocks and turning on/off parts corresponding to the plurality of blocks in the backlight or turning on/off the entire backlight.

The 3D image display device may further include 3D glasses synchronized with the 3D image display device. The driving method may further include turning on/off lenses of the 3D glasses according to a signal of the 3D image display device. The lenses of the 3D glasses may be turned on or off, for example, by employing an active shutter mechanism that blocks or permits light from passing through the lens.

The 3D image display device may include a frame rate conversion (FRC) unit, a signal processor, a data driver, a gate driver, a liquid crystal display panel, a backlight positioned on a rear surface of the liquid crystal display panel, and 3D glasses. The displaying of the left-eye image and the right-eye image may further include receiving an external image signal inputted into the FRC unit, and rearranging the received image signal as any one of LLLRRR, LLBRRB, LLLLR-RRR, and LLLBRRRB to transfer one arrangement to the signal processor. Here, L represents the left-eye image, R represents the right-eye image, and B represents the black image.

An exemplary embodiment of the present invention provides a 3D image display device having a 2D mode to display a 2D image and a 3D mode to display a 3D image. A signal processor, a data driver, a gate driver, and a liquid crystal display panel are also provided. A 2D frequency is an operational frequency operating when displaying the 2D. A 3D frequency is an operational frequency operating when displaying the 3D image. The 2D frequency is lower than the 3D frequency. The signal processor transfers image data to the data driver and applies the left-eye image or the right-eye image to a data line of the liquid crystal display panel with the same polarity throughout at least two consecutive frames. The signal processor controls the gate driver and a gate-on voltage is applied to a plurality of gate lines crossing the data line sequentially at an interval of a compensation gate-on application time that is calculated based on a total data delay value in which a data voltage is delayed along the data line.

The compensation gate-on application time may be acquired by adding a reference data delay value which is acquired by dividing the total data delay value by the total number of the plurality of gate lines, to one horizontal period 1 H.

When the number of frames in which the left-eye image or the right-eye image is consecutively applied is x, a time acquired by multiplying a time acquired by subtracting a total gate delay value from an effective charge time by x in the 3D mode may be larger than a time acquired by subtracting the total gate delay value from the effective charge time in the 2D mode.

The 3D frequency may be 1.5 to four times higher than the 2D frequency.

A 3D image signal group including the left-eye image and the right-eye image may be divided into a left-eye image group and a right-eye image group. A black image may be included in a last frame of the left-eye image group and a last frame of the right-eye image group.

The gate-on voltage may be applied for a time which is twice as long as a time when the gate-on voltage is applied in the frame in which the left-eye image and the right-eye image may be applied. The gate-on voltage may be applied in the frame in which the black image is applied.

The signal processor may further include a frame memory. The signal processor may store inputted image data in the frame memory and generate image data rearranged to be suitable for the 3D frequency. The generated image data may be output to the data driver.

The left-eye image and the right-eye image may be rearranged as any one of arrangements such as LLLRRR, LLBRRB, LLLLRRRR, and LLLBRRRB. Here, L represents the left-eye image, R represents the right-eye image, and B represents the black image.

The signal processor may perform in DCC processing of the inputted input image data in addition to the rearrangement processing.

The 3D image display device may further include a backlight positioned on a rear surface of the liquid crystal display panel. The backlight may include a light source. The light source of the backlight may be divided into predetermined blocks and thereafter, the blocks may be turned on/off or the entire backlight may be turned on/off.

The 3D image display device may further include 3D glasses synchronized with the 3D image display device, and lenses of the 3D glasses may be turned on/off according to a signal of the 3D image display device.

The 3D image display device may further include an FRC unit. The FRC unit receives an external image signal inputted from the outside and rearranges the received image signal as any one of arrangements such as LLLRRR, LLBRRB, LLLL-RRRR, and LLLBRRRB to transfer one arrangement to the signal processor. Here, L represents the left-eye image, R represents the right-eye image, and B represents the black image.

According to exemplary embodiments of the present invention, a left-eye image and a right-eye image are applied to a data line of a liquid crystal display panel with the same polarity throughout at least two consecutive frames. A charge amount is sufficient at a high frequency. As a result, display luminance is increased.

A 3D image display device is driven by compensating for a delay of a gate voltage or a data voltage such that display quality does not deteriorate at a high frequency.

A liquid crystal display panel according to exemplary embodiments of the present invention that is capable of displaying a 2D image at 120 Hz or 240 Hz can prevent the display quality from being erroneous in a 3D image by applying the left-eye image and the right-eye image with the same polarity throughout at least two frames. As a result, since an additional component does not need to be added and the structure of the liquid crystal display panel does not need to be changed, a manufacturing cost is reduced.

An exemplary embodiment of the present invention provides a method for driving a display device, comprising: determining whether a display device is operating in a 2D mode for displaying only two-dimensional images or a 3D mode for displaying three-dimensional images; displaying a 2D image at a predetermined 2D display frequency when it has been determined that the display device is operating in the 2D mode; and displaying a 3D image at a predetermined 3D display frequency that is a multiple of the 2D display frequency when it has been determined that the display device is operating in the 3D mode, wherein the displaying the 3D image includes: applying a first data voltage representing a left-eye image or a right-eye of the 3D image to a data line; applying a second data voltage having an identical polarity and magnitude of the first data voltage to the data line in a consecutive frame; and sequentially applying a gate-on voltage to a plurality of gate lines crossing the data line at an interval of a compensation gate-on application time that is calculated based on a total data delay value.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EXEMPLARY EMBODIMENTS

Figure 1:
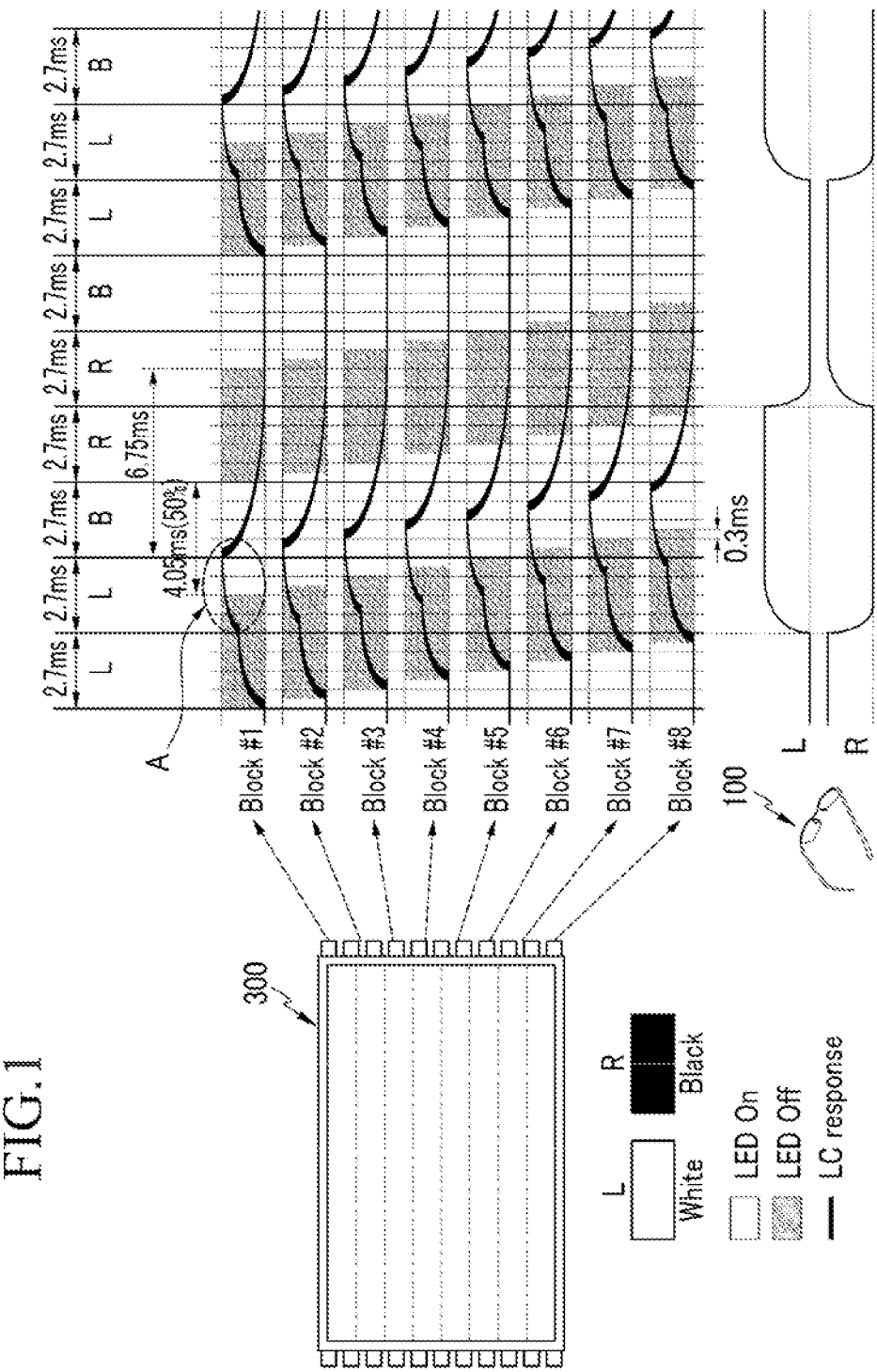
FIG. 1 is a diagram showing an operation of a 3D image display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Hereinafter, a 3D image display device according to an exemplary embodiment of the present invention will be described in detail with reference to FIG. 1.

FIG. 1 is a diagram showing an operation of a 3D image display device according to an exemplary embodiment of the present invention.

The 3D image display device according to an exemplary embodiment of the present invention has a mode to display a 3D image (hereinafter, referred to as a 3D mode) and a mode to display a 2D image (hereinafter, referred to as a 2D mode).

The display device is capable of displaying moving images by sequentially displaying a series of still images as frames. The rate at which image frames are displayed is known as the display frequency. For example, when the display device has a frequency of 60 Hz, the display device displays 60 frames per second. In the 3D image display device, according to an exemplary embodiment, a frequency used to display an image in the 2D mode (hereinafter, referred to as a 2D frequency) and a frequency used to display the image in the 3D mode (hereinafter, referred to as a 3D frequency) are different from each other and the 2D frequency is lower than the 3D frequency. A display device may be capable of displaying video at one of a number of different display frequencies. Generally, a display device is capable of displaying at a base frequency, which may be a lowest possible frequency, and multiples thereof. When a base frequency is 60 Hz, a frequency which is at least twice as high as the base frequency is required to display the image in the 3D mode. This is because a left-eye image L signal and a right-eye image R signal should be separately displayed and if a left-eye image is being displayed 60 frames per second and a right-eye image is being displayed 60 frames per second then the display device is displaying frames at a rate of 120 frames per second. According to an exemplary embodiment of the present invention, the 2D frequency may be 60 Hz, which is the base frequency, and the 3D frequency may be 120 Hz, which is twice as high as the base frequency or 240 Hz, which is four times higher than the base frequency. Alternatively, the 3D frequency may be 360 Hz, which is six times higher than the base frequency, or 480 Hz, which is eight times higher than the base frequency. Various base frequencies may be used for each panel and a frequency other than 60 Hz may be used as the 2D frequency.

To display the 3D mode, the left-eye image should be applied to a left eye of a user and the right-eye image should be applied to a right eye of the user. A 3D image display device 300 according to an exemplary embodiment of the present invention includes a first section for displaying the left-eye image and a second section for displaying the right-eye image. The first and second sections may be separate from each other. 3D glasses 100 may be used to observe the display device 300. The left lens of the 3D glasses is transparent to light emitted from the first section for displaying the left-eye image and the right lens of the 3D glasses is opaque to the light emitted from the first section for displaying the left-eye image. Similarly, the right lens of the 3D glasses is transparent to light emitted from the second section for displaying the right-eye image and the left lens of the 3D glasses is opaque to the light emitted from the second section for displaying the right-eye image. As a result, the left-eye image is applied only to the left eye and the right-eye image is applied only to the right eye to view the 3D image.

As described above, in the case of viewing the 3D image display device 300 by turning on/off the respective lenses of the 3D glasses 100, black data may be inserted between the left-eye image and the right-eye image, all or some of backlights may be turned off for a predetermined time, or both lenses of the 3D glasses 100 may be opaque to solve a crosstalk problem in which the left-eye image and the right-eye image are perceived by the incorrect eye. Among the methods, in the exemplary embodiment of FIG. 1, a method of turning on/off the backlights for each block by inserting the black data and dividing the backlights into a plurality of blocks is used.

FIG. 1 is a waveform diagram showing a case in which the 3D image is displayed at 360 Hz, white is displayed with the left-eye image, and black is displayed with the right-eye image according to an exemplary embodiment of the present invention.

A liquid crystal display panel of the 3D image display device 300 is divided into 8 distinct blocks each extending horizontally along a gate line. In FIG. 1, to express each block, the liquid crystal display panel is divided by adding dotted lines to the 3D image display device 300. Each block includes the same number of gate lines.

The 3D image display device 300 includes backlights positioned on a rear surface of the liquid crystal display panel. The backlights may include a fluorescent lamp such as a CCFL or a light emitting diode such as an LED. In the exemplary embodiment of FIG. 1, the LED will be described.

The LED of the backlight is made up of sections that may be independently activated and deactivated and light may be targeted to select portions of the liquid crystal display. Thus, when it is desired that only certain blocks of the LCD be viewable, the LED backlight sections corresponding to those blocks are activated and all other LED backlight sections are deactivated.

In FIG. 1, the timing at which the LED corresponding to the relevant block is turned on/off is shown on the waveform diagram. On the waveform diagram, a part marked with a white color corresponding to "LED On" represents a section where the LED of the backlight is turned on and a part marked with a gray color corresponding to "LED Off" represents a section where the LED of the backlight is turned off. In a first block Block #1, a turn-off state of the relevant LED is maintained for 4.05 ms and thereafter, changed to a turn-on state and this operation is repeated at the cycle of 4.05 ms. In this example, 4.05 ms is a value which is 1.5 times longer than 2.7 ms which is equal to a single horizontal period 1 H. Accordingly, while driving at 360 Hz, a duty ratio between turn-on and turn-off of the LED is 50%. An LED corresponding to a second block Block #2 operates later than the first block Block #1 by approximately 0.3 ms. When the LED corresponding to the first block Block #1 is turned on, the LED corresponding to the second block Block #2 is also turned on after approximately 0.3 ms and when the LED corresponding to the first block Block #1 is turned off, the LED corresponding to the second block Block #2 is also turned off after approximately 0.3 ms. As shown in FIG. 1, the blocks operate sequentially at an interval of approximately 0.3 ms.

In a right waveform diagram of FIG. 1, a waveform shown for each block represents a response of a representative liquid crystal layer in the case of displaying the 3D image and in the maximum response, white is displayed and in the minimum response, black is displayed. Accordingly, the displayed image may only be observable during a period of time in which the liquid crystal layer has achieved its maximum response.

To display the 3D image, data may be displayed in the following order: left-eye image data L, the left-eye image data L, black image data B, right-eye image data R, the right-eye image data R, and the black image data B. This sequence may be repeated at the frequency of 360 Hz. Hereinafter, this sequence may be represented by 'LLBRRB' and this sequence may be called a 3D image signal group.

In the waveform diagram of FIG. 1, white is applied to the left-eye image data L. Because of the nature of the liquid crystal layer response, the liquid crystal layer does not receive the data voltage for a sufficient time during a frame in which the left-eye image data L is first applied in each block, and as a result, white, which is desired luminance, is not displayed.

As described herein, one frame is 2.7 ms while driving at 360 Hz, but in the case of a panel having full HD resolution, since 1080 gate lines are provided, a time when a gate-on voltage can be applied to one gate line (hereinafter, referred to as an effective charge time) is approximately 2.47 µs (see FIG. 2). The time of approximately 2.47 µs does not reach 3.7 µs (see FIG. 3) which is an effective charge time used to display the image at 240 Hz, such that sufficient charging is not achieved.

As described above, since the liquid crystal layer may not be charged for a sufficient time, a left-eye data voltage is applied with the same polarity at least once more in an exemplary embodiment of the present invention. As a result, in a second frame, white, which is the target luminance, can be displayed. Since this case is substantially the same as the case in which the liquid crystal layer is charged during the effective charge time acquired by adding a first effective charge time and a second effective charge time, here the liquid crystal layer is charged for a total of 4.94 µs (2.47*2).

Accordingly, when displaying the 3D image in the 3D mode in accordance with an exemplary embodiment of the present invention, by displaying the image at a higher frequency than the 2D mode, the effective charge time may be reduced. However, the left-eye data voltage or right-eye data voltage having the same polarity is applied consecutively at least twice to obtain the sufficient charge time. Data applied in the first frame between the left-eye image data or the right-eye image data applied consecutively at least twice has a free charge effect, such that the corresponding data is also called free charging image data.

According to the waveform diagram of FIG. 1, the black data is inserted in the next frame (third frame) to display a black image.

In a fourth frame, the right-eye image data R is inputted. Because the right-eye image data R does not obtain the sufficient effective charge time, the right-eye data voltage with the same polarity is additionally inputted once more in a fifth frame to obtain the sufficient effective charge time. Thereafter, in a sixth frame, the black data is inserted to display the black image. However, in FIG. 1, since the black data is used as the right-eye image data R, the right-eye image data R and the black image data B are equivalent. However, in FIG. 1, the right-eye image data R is limited to black to describe the operation of the 3D image display device 300 while in practice, data of various gray levels may be displayed.

As described above, when one 3D image signal group LLBRRB is displayed on the display panel, total 6 frames are required and 6 frames are consumed at 360 Hz. This may take the same time as one frame at the base frequency of 60 Hz.

The LED of the backlight is turned on/off while one 3D image signal group is displayed and in the case where 3D glasses 100 are used, the left lens and the right lens of the 3D glasses are turned on/off.

Referring to FIG. 1, the LEDs corresponding to the blocks are turned on/off sequentially at an interval of approximately 0.3 ms and a duty ratio between the turn-on and the turn-off is 50%. In the case of the turn-on/off duty ratio, the turn-on section may be increased in some exemplary embodiments and the turn-on section may be increased to 60 to 70%. When the LED is turned on, the liquid crystal layer is arranged to display a desired gray. To increase the turn-on section of the LED, a response speed depending on a charge time of liquid crystals, is high.

The time in which the left lens of the 3D glasses 100 is turned on to be transparent is after the left-eye image is fully removed from the display panel. Alternatively, the left lens is turned on after all the black data inserted into all the panels are displayed. In either event, the left lens remains on to view all the left-eye images displayed thereafter. However, although the left lens is turned on, the LED is repeatedly turned off and turned on in each block to thereby view a black screen at least partially. Thereafter, when the left-eye image is fully removed from the display panel (or alternatively, when all the black data inserted into all the panels are displayed), the left lens is turned off to be opaque and the right lens is turned on to be transparent.

In the above description, a method of displaying the 3D image has been described through FIG. 1 and hereinafter, a gate signal and a data signal applied in displaying the 3D image through FIG. 2 will be described.

Figure 2:
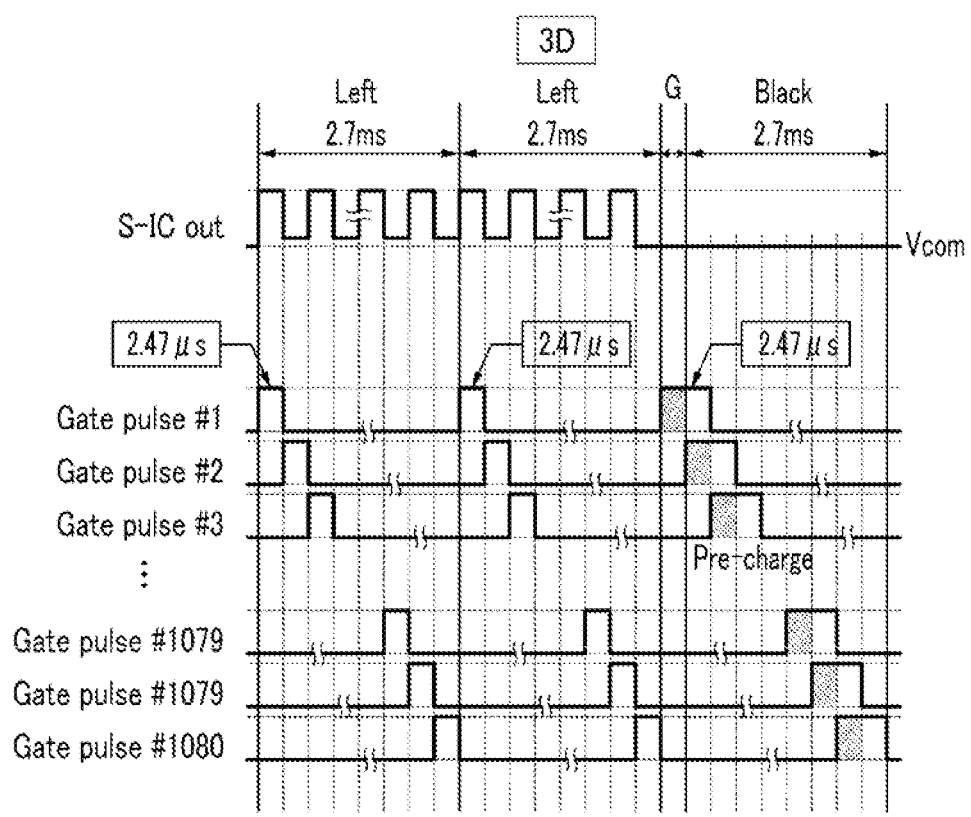
FIG. 2 is a waveform diagram of signals applied to a gate line and a data line to display a 3D image in the 3D image display device according to an exemplary embodiment of the present invention.

FIG. 2 is a waveform diagram of signals applied to a gate line and a data line displaying a 3D image in the 3D image display device according to an exemplary embodiment of the present invention.

In FIG. 2, except for the times when the LED corresponding to each block is turned on/off and the lenses of the 3D glasses 100 are turned on/off, signals applied to one data line of the liquid crystal display panel and 1080 gate lines crossing the one data line are shown. In FIG. 2, only a left-eye image group LLB in one 3D image signal group LLBRRB is shown and since a right-eye image group RRB is similar to FIG. 2, the right-eye image group RRB is omitted.

First, during a first 1 H (1 horizontal period) of a first frame, a first gate-on voltage Gate pulse #1 is applied to a first gate line. During a second 1 H, a second gate-on voltage Gate pulse #2 is applied to a second gate line. The gate-on voltage is sequentially applied up to a 1080-th gate line at an interval of 1 H. Simultaneously, a data voltage corresponding to a left-eye image signal (hereinafter, referred to as a left-eye data voltage) is applied from an output terminal S-IC out of the data driver at the interval of 1 H. The left-eye data voltages, having different magnitudes depending on each pixel to which the left-eye data voltage will be applied, are applied at the output terminal S-IC out of the actual data driver. However, FIG. 2 only shows points in which an output voltage changed. FIG. 2 shows that since the left-eye data voltage output from the output terminal S-IC out of the data driver is higher than a common voltage Vcom, the data voltage having the same polarity is applied. However, in some exemplary embodiments, a data voltage having different polarities may be applied in one frame according to a predetermined rule.

Thereafter, in the second frame, the gate-on voltage is sequentially applied at the interval of 1 H similarly to the first frame and the output terminal S-IC out of the data driver applies the left-eye data voltage to the data line at the interval of 1 H. The data voltages depending on the left-eye image signal in the first frame and the second frame, which are applied to the same pixel, have the same polarity and magnitude. Accordingly, charging may be achieved throughout two frames as the liquid crystal is not sufficiently charged within one frame. As a result, since the data voltage applied in the first frame has a free charge property, the corresponding data voltage is also called a free charging data voltage.

The black data is applied in the third frame and since the black data should be applied only during one frame, the effective charge time of the black data may be insufficient. Therefore, as shown in FIG. 2, the gate-on voltage is applied by modifying a gate-on time applied to one gate line to 2 H which is twice as long as 1 H.

According to an exemplary embodiment of the present invention, during a blank period G between the second frame and the third frame, the first gate-on pulse Gate pulse #1 is applied to the first gate line in advance and is maintained during 2 H. After 1 H has elapsed from the application of the first gate-on pulse Gate pulse #1, the second gate-on pulse #2 is applied to the second gate line and is maintained during 2 H (approximately 4.94 µs). As described above, the gate-on pulse, which is maintained during 2 H, is applied sequentially to each gate line at the interval of 1 H. As described above, the black data voltage (for example, the common voltage Vcom) is applied from the output terminal S-IC out of the data driver while the gate-on voltage is applied. As a result, the black image B is applied only for 2.7 ms which is one frame, but each pixel is charged during the sufficient effective charge time and the black image is displayed in each pixel.

In some exemplary embodiments, in displaying the black image, the gate-on voltage may be applied to all the gate lines at the same time. The gate-on voltage may be maintained during a length of time equal to 2 H or more, considering the effective charge time.

In the above description, the method of displaying the 3D image in the 3D image display device according to an exemplary embodiment of the present invention has been described with reference to FIGS. 1 and 2.

Hereinafter, a method of displaying a 2D image in a 2D mode in the 3D image display device according to an exemplary embodiment of the present invention will be described in FIG. 3.

Figure 3:
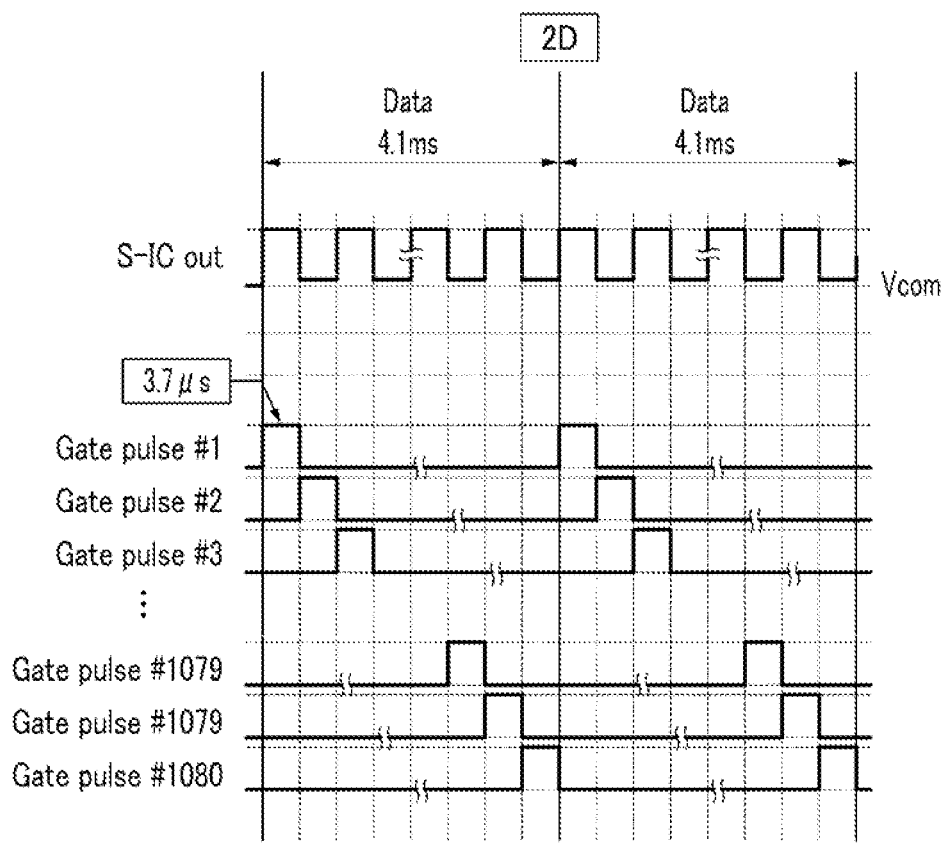
FIG. 3 is a waveform diagram of signals applied to a gate line and a data line to display a 2D image in the 3D image display device according to an exemplary embodiment of the present invention.

FIG. 3 is a waveform diagram illustrating signals applied to a gate line and a data line to display a 2D image in the 3D image display device according to an exemplary embodiment of the present invention.

In the 2D mode of the 3D image display device, the image is displayed at a frequency lower than the 3D frequency used in the 3D mode. In FIG. 3 the 2D frequency is 240 Hz. As a result, one frame in the 2D mode may be approximately equal to 4.1 ms and may thus be longer than one frame (approximately 2.7 ms) in the 3D mode. Moreover, 1 H in the 2D mode may be approximately 3.7 µs and may be longer than 1 H (approximately 2.47 µs) in the 3D mode.

FIG. 3, the signals applied to one data line of the liquid crystal display panel and 1080 gate lines crossing the one data line are shown.

During the first 1 H of the first frame, the first gate-on voltage Gate pulse #1 is applied to the first gate line. During the second 1 H, the second gate-on voltage Gate pulse #2 is applied to the second gate line. The gate-on voltage is sequentially applied up to the 1080-th gate line at the interval of 1 H. Simultaneously, the data voltage is applied from the output terminal S-IC out of the data driver at the interval of 1 H. The data voltages having different magnitudes, depending on each pixel to which the data voltage will be applied, are applied from the output terminal S-IC out of the actual data driver. However, only the point that the output voltage is changed is shown in FIG. 3. FIG. 3 shows that since the data voltage output from the output terminal S-IC out of the data driver is higher than the common voltage Vcom, the data voltage having the same polarity is applied. However, in some exemplary embodiments of the present invention, the data voltage having different polarities may be applied in one frame according to a predetermined rule.

Thereafter, in the second frame, the gate-on voltage is sequentially applied at the interval of 1 H similarly to the first frame and the output terminal S-IC out of the data driver also applies the data voltage to the data line at the interval of 1 H.

Since each of the first frame and the second frame has 3.7 µs as the effective charge time, each frame has sufficient time to fully charge. Therefore, a data voltage applied in the first frame and a data voltage applied in the second frame may have different polarities and further, may have different magnitudes.

In the 2D mode, the left-eye image L and the right-eye image R are not distinguished from each other as shown in FIG. 1 and the LED corresponding to each block need not be turned on/off and the lens of the 3D glasses 100 need not be turned on/off. In the 2D mode, the black image B may be inserted between the images. When the black image B is inserted, the black image B is inserted between inputted image signals by changing the frequency to a frequency which is twice as high as a frequency of the inputted image signal and a display characteristic of a moving picture is increased.

As shown in FIG. 3, when a 2D image is displayed in the 2D mode at 240 Hz, the display characteristic is prevented from being deteriorated according to the effective charge time and a signal delay.

However, as shown in FIGS. 1 and 2, when the 3D image is displayed in the 3D mode at the high frequency, as the effective charge time is decreased, the signal delay helps to reduce the effective charge time.

Therefore, a method for preventing the display characteristic from being deteriorated from the signal delay in the 3D image display device according to an exemplary embodiment of the present invention will be described below with reference to FIGS. 4 and 5.

Figure 4:
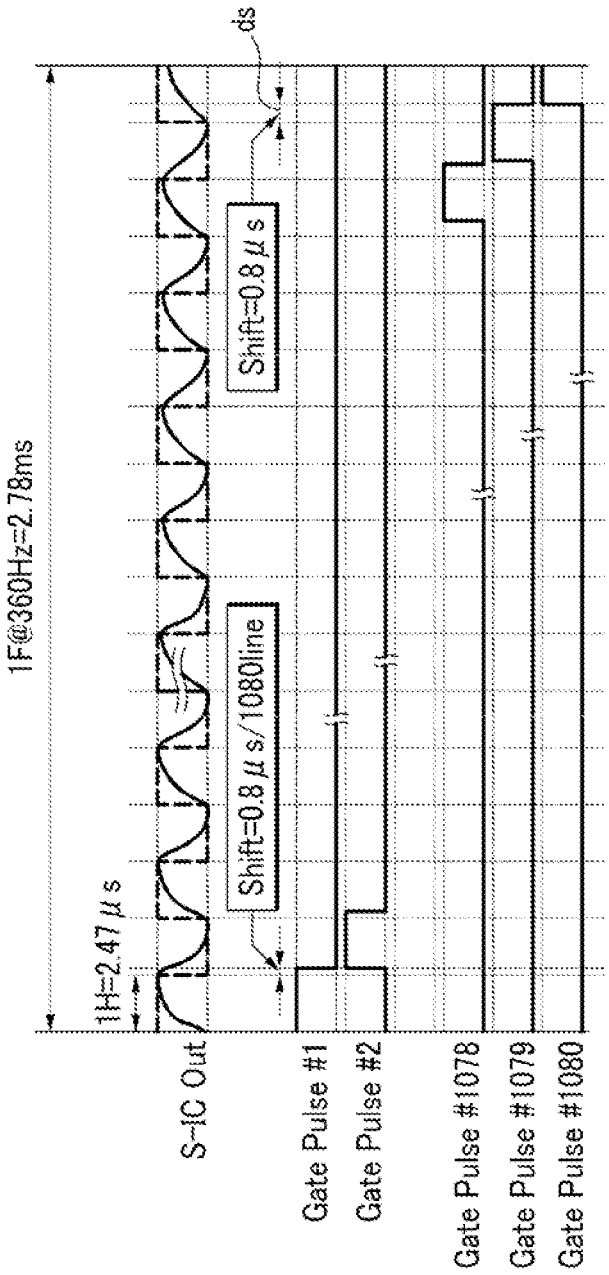
FIG. 4 is a waveform diagram showing a method of applying a gate voltage to compensate for a delay of a data voltage generated as being distant from a data driver in the 3D image display device according to an exemplary embodiment of the present invention.

In FIG. 4, a method of solving a problem due to the signal delay generated along the data line will be described according to an exemplary embodiment of the present invention.

FIG. 4 is a waveform diagram showing a method of applying a gate voltage to compensate for a delay of a generated data voltage which is far from a data driver in the 3D image display device according to an exemplary embodiment of the present invention.

In FIG. 4, the signals applied to one data line of the liquid crystal display panel and 1080 gate lines crossing the one data line are shown.

In FIG. 4, the data voltage is changed and output from the output terminal S-IC out of the data driver at each 1 H and a large voltage difference is generated in a square-wave pattern (as shown in FIG. 4 with dotted lines). The data voltage is delayed while the magnitude of the data voltage is decreased as the data voltage is farther from the data driver 500 (see part A of FIG. 6) while the data voltage applied to the actual data line is changed sequentially.

The delay may be unnoticeable before the data voltage applied to the data line reaches the first gate line. However, a significant delay is generated when the data voltage reaches the last 1080-th gate line and in the exemplary embodiment of FIG. 4, generation of a delay (shown as 'ds' in FIG. 4 and hereinafter, referred to as 'a total data delay value') of 0.8 µs is measured in the exemplary embodiment shown in FIG. 4.

As described above, in driving in the 3D mode while disregarding the delay of 0.8 µs, pixels connected with the 1080-th gate line experience a loss of 0.8 µs as the effective charge time. As a result, the pixels may not be charged with desired luminance.

To correct for this problem according to an exemplary embodiment of the present invention, a value (hereinafter, referred to as a 'reference data delay value') acquired by dividing a total data delay value generated in a last gate line by the total number of gate lines is calculated and an application time of the gate-on voltage is increased by a reference data delay value for each gate-on voltage to be applied to each gate line. Since a gate-on voltage applied to the next gate line is applied only when a gate-on voltage of a previous gate line should be terminated, a gate-on timing applied to each gate line has the same effect as being delayed.

Accordingly, each gate-on voltage is continuously applied for a time (hereinafter, referred to as a 'compensation gate-on application time') by adding the reference data delay value to 1 H. As a result, the first gate-on voltage Gate pulse #1 applied to the first gate line is applied for the compensation gate-on application time and the second gate-on voltage Gate pulse #2 is applied to the second gate line while the first gate-on voltage is changed to a gate-off voltage. The second gate-on voltage is applied for the compensation gate-on application time. As described above, when each gate-on voltage is applied for the compensation gate-on application time, the gate-on voltage applied to the 1080-th gate line is applied with a delay and is thus later than an originally applied timing by the total data delay value As a result, the image can be appropriately displayed although the data voltage is delayed.

In FIG. 4, a cycle of a gate enable signal (for example, a signal that allows the gate-on voltage to be applied in the gate driver 400, e.g., a CPV signal) may be set to the compensation gate-on application time which is longer than 1 H.

Figure 5:
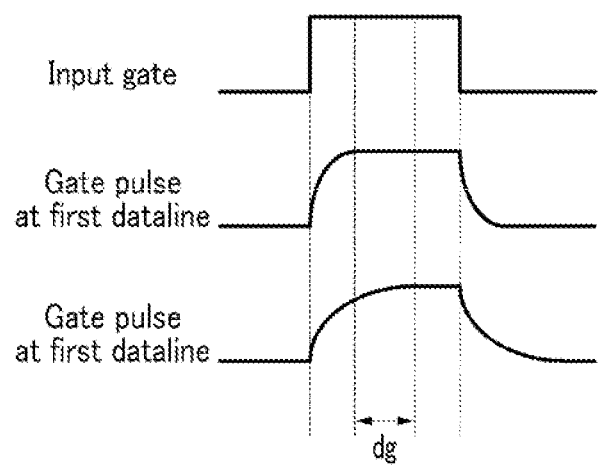
FIG. 5 is a waveform diagram showing a delay of a gate voltage generated as being distant from a gate driver in the 3D image display device according to an exemplary embodiment of the present invention.

FIG. 5 is a waveform diagram showing a delay of a generated gate voltage that is distant from a gate driver in the 3D image display device according to an exemplary embodiment of the present invention.

In FIG. 5, gate-on voltages in one gate line of the liquid crystal display panel, and a first data line and a last data line among data lines crossing the one gate line are shown.

The gate-on voltage having a high value among inputted gate voltages (input gate) is maintained for 1 H or the compensation gate-on time.

The gate voltage at a location crossing the first data line close to the gate driver 400 is not changed instantly from a low voltage (gate-off voltage) to a high voltage (gate-on voltage). Accordingly, the gate voltage reaches the gate-on voltage after a predetermined time has elapsed. However, a time when the gate voltage at a position crossing the last data line farthest from the gate driver 400 reaches the high voltage, which is the gate-on voltage, is most delayed. A difference (shown as 'dg' in FIG. 5, hereinafter, referred to as a 'total gate delay value') between a time of reaching the high voltage in the part crossing the first data line and a time of reaching the high voltage in a part crossing the last data line is generated. The effective charge time is reduced by as much as the total gate delay value in the part (see part B of FIG. 6) crossing the last data line due to the total gate delay value. For example, when the total gate delay value is 0.8 µs, the effective charge time during one frame becomes 2.47 µs–0.8 µs=1.67 µs in driving at 360 Hz. However, in an exemplary embodiment of the present invention, since the left-eye data voltage or the right-eye data voltage having the same polarity is applied repeatedly at least twice, the effective charge time is 1.67 µs*2, i.e., 3.34 µs, which is larger than 2.9 µs (=3.7 µs–0.8 µs) which is the effective charge time at 240 Hz due to the gate delay. As a result, according to an exemplary embodiment of the present invention, the gate delay value may have a sufficient margin.

However, in a case where the total gate delay value is large according to a characteristic of the panel and the effective charge time does not reach the effective charge time at 240 Hz in spite of applying the left-eye image data L or the right-eye image data R consecutively twice at 360 Hz, the left-eye image data L or the right-eye image data R may be applied consecutively three times at 360 Hz.

In the liquid crystal display panel 310, there is a part where both the delay of the data line of FIG. 4 and the delay of the gate line of FIG. 5 are generated. This part is illustrated as an area where region A and region B are overlapped with each other in FIG. 6. The area where region A and region B are overlapped with each other compensates for the delay of the data voltage while the gate-on voltage is applied every compensation gate-on application time. This area also compensates for the delay of the gate voltage by judging whether the sufficient margin is provided based on the total gate delay value. As a result, there display quality may be increased.

The above-mentioned 3D image display device 300 will be described in more detail with reference to FIG. 6.

Figure 6:
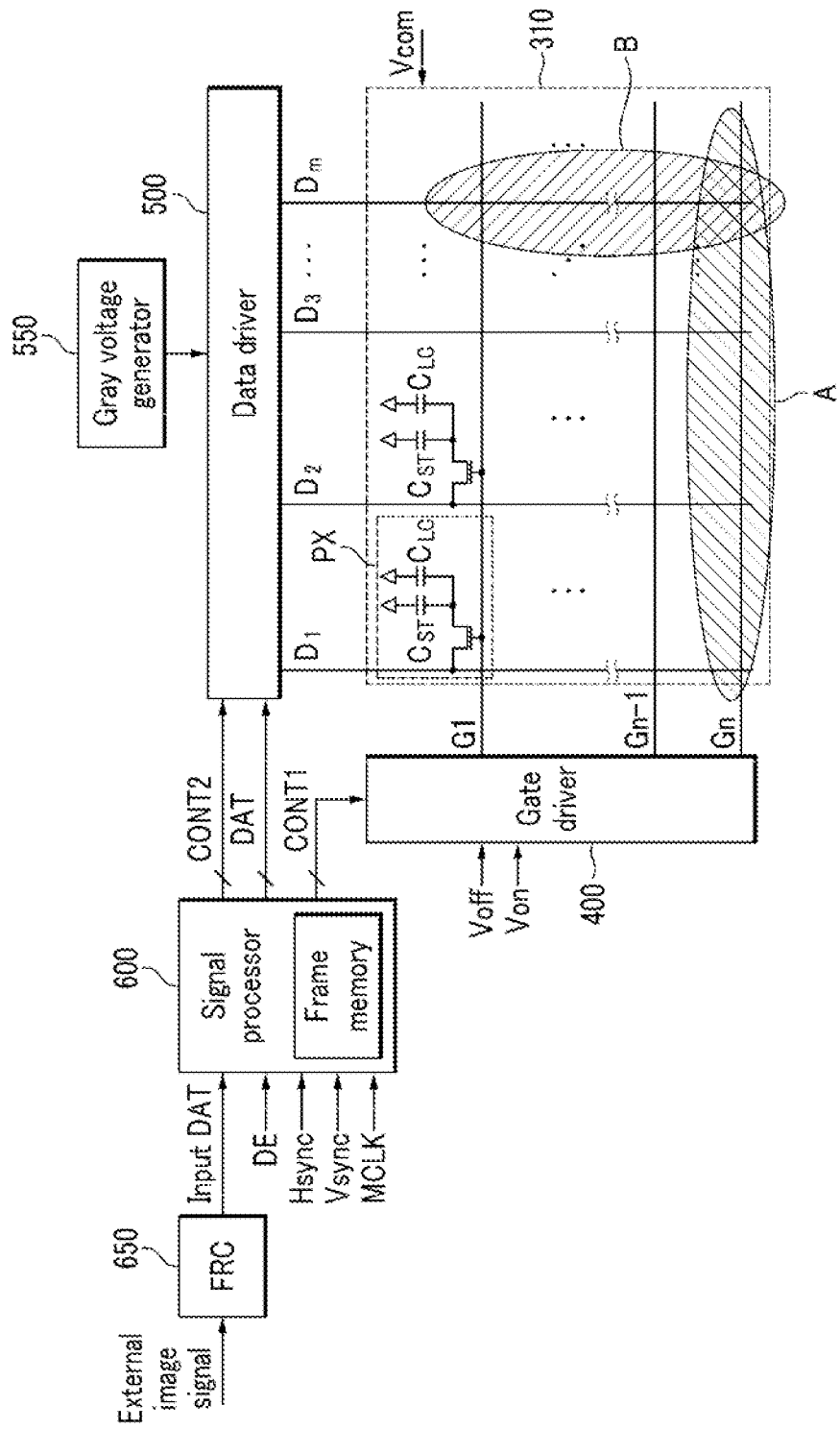
FIG. 6 is a block diagram of a 3D image display device according to an exemplary embodiment of the present invention.

FIG. 6 is a block diagram of a 3D image display device according to an exemplary embodiment of the present invention.

The 3D image display device 300 includes a liquid crystal display panel 310, a gate driver 400, a data driver 500, a gray voltage generator 550, a signal processor 600, and an FRC unit 650.

The liquid crystal display panel 310 includes gate lines G1 to Gn and data lines D1 to Dm that cross each other and the liquid crystal display panel 310 also includes a plurality of pixels PX that are connected to a pair of gate lines G1 to Gn and data lines D1 to Dm and arranged in a matrix.

One pixel PX is connected with one gate line and one control terminal and includes a thin film transistor in which an input terminal is connected to one data line and includes a liquid crystal capacitor $C_{LC}$ and a storage capacitor $C_{ST}$ at an output terminal of the thin film transistor. The liquid crystal display panel 310, according to an exemplary embodiment of the present invention, includes one switching element in which one pixel is connected to one gate line and one data line.

In some 3D image display devices, since a charge rate is low due to high-speed driving, an additional structure is formed in the liquid crystal display panel 310 to compensate for the charge rate. However, in an exemplary embodiment of the present invention, since the charge rate is compensated by applying the left-eye data voltage or the right-eye data voltage having the same polarity consecutively at least twice in spite of using the existing liquid crystal display device, the liquid crystal display device can be used without adding the additional structure to the existing liquid crystal display panel.

An external image signal is applied to the FRC unit 650 and the FRC unit 650 rearranges the external image signal according to a processing specification of the signal processor 600 and transfers the rearranged external image signal to the signal processor 600 as input data Input DAT. In the input data Input DAT, left-eye data and right-eye data are separately included in a 3D mode and a left-eye image, the left-eye image, a right-eye image, and the right-eye image are sequentially arranged like LLRR at 240 Hz.

The signal processor 600 receives the input data Input DAT and compensates the received input data Input DAT and outputs compensated image data DAT to transfer the corresponding image data DAT to the data driver 500 in accordance with the present mode.

When the input data Input DAT of LLRR at 240 Hz is inputted, the signal processor 600 rearranges the left-eye image data, the left-eye image data, black image data, the right-eye image data, the right-eye image data, and the black image data in sequence like LLBRRB at 360 Hz and thereafter, transfers the rearranged image data to the data driver 500 as the image data DAT. The black image data is not inserted in the signal processor 600 but transferred to the data driver 500 in the form of LLLRRR and thereafter, the data driver replaces L and R with a black data voltage to apply a data voltage corresponding to LLBRRB.

The signal processor 600 modifies an inputted main clock MCLK to change the modified clock to a clock suitable for a frequency such as 360 Hz and the inputted main clock MCLK may be a base frequency or a 2D frequency.

Since the signal processor 600 stores data for a predetermined time due to a difference in frequency between the inputted input data Input DAT and the output image data DAT, the signal processor 600 includes a frame memory. In storing the data in the frame memory, the input data Input DAT may be inputted as it is, but the input data Input DAT may be compressed and stored to reduce a capacity of the frame memory.

The signal processor 600 may compensate the input data Input DAT and thereafter, output the compensated input data as the image data DAT to more quickly display the image in the liquid crystal display panel. Dynamic capacitance compensation (DCC) processing described below may be performed. The DCC processing compensates image data of a present frame with a predetermined compensation value depending on a difference between the image data of the present data and image data of an existing frame to increase a response speed of liquid crystals. The predetermined compensation value may be stored in a DCC lookup table LUT.

The signal processor 600 may compensate the input data Input DAT and thereafter, output the compensated input data as the image data DAT to appropriately display the image depending on a gamma characteristic of the liquid crystal display panel. Accurate color capture (ACC) processing described below may be performed. For example, the ACC processing gamma-compensates input data Input DAT inputted from the outside based on a predetermined compensation gamma value (stored in an ACC lookup table) depending on a gamma characteristic of the display device.

The data driver 500 generates a gray voltage in the gray voltage generator 550 by using a control signal CONT2 and the image data DAT and applies the generated gray voltage to the data lines D1 to Dm as the data voltage.

The gate driver 400 alternately applies a gate-on voltage Von and a gate-off voltage Voff to the gate lines G1 to Gn according to the control signal CONT1 of the signal processor 600. The gate-on voltage is maintained for 1 H or the compensation gate-on application time and thereafter, the gate-on voltage is applied from a gate line therebelow.

According to exemplary embodiments of the present invention, the gate-on voltage may be applied for 2 H (alternatively, twice compensation gate-on application time) or may be applied to all the gate lines at the same time to display the black image B.

In the above description, the cases in which the 3D image display device operates at 240 Hz in the 2D mode and at 360 Hz in the 3D mode have been described. However, in some exemplary embodiments, the 3D image display device may have different operational frequencies and in particular, various exemplary embodiments of the image data DAT in the 3D mode will be described.

Figure 7:
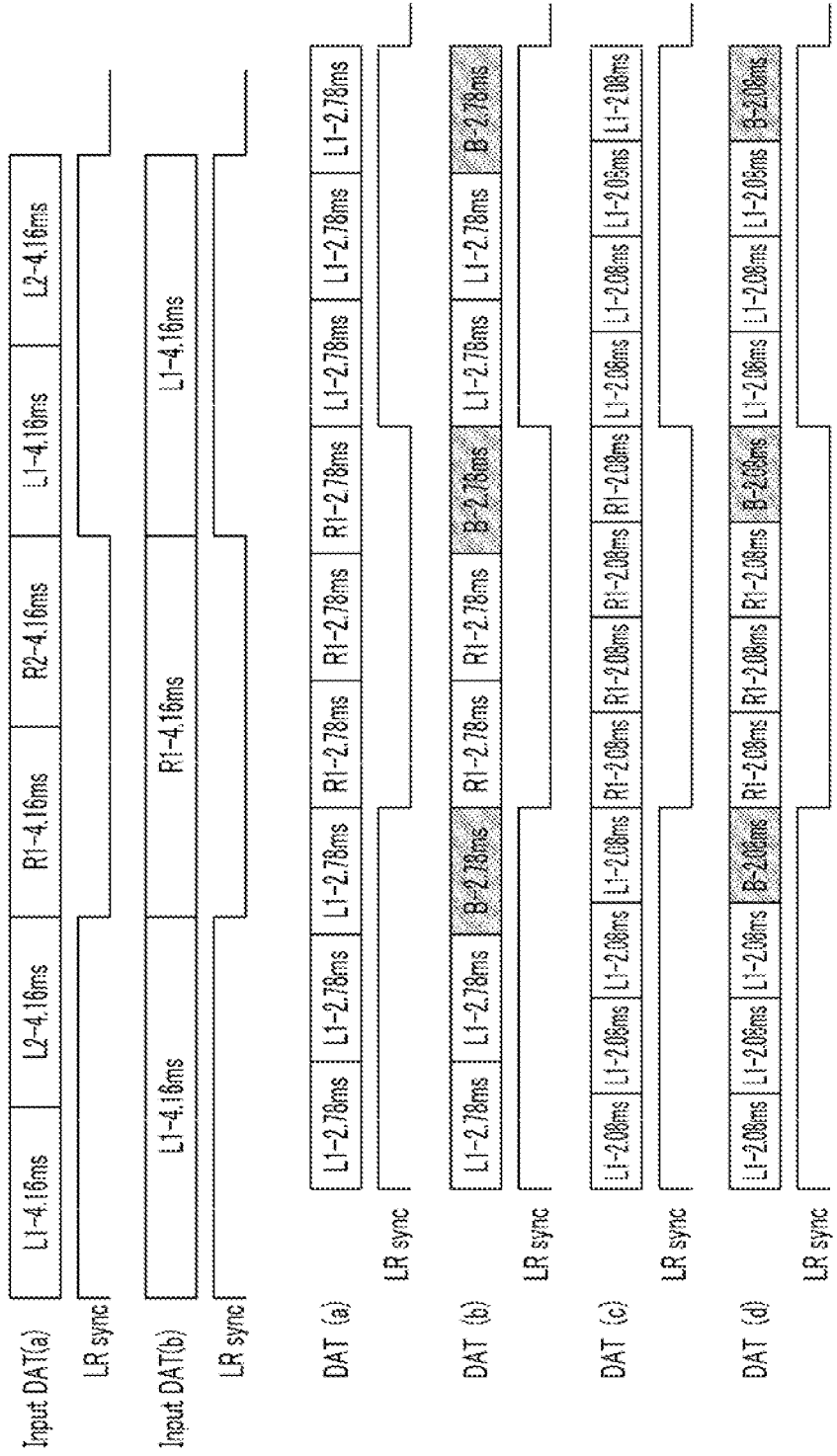
FIG. 7 is a diagram showing examples of various 3D image displaying data according to an exemplary embodiment of the present invention.

FIG. 7 is a diagram showing an example of various 3D images displaying data according to an exemplary embodiment of the present invention. In FIG. 7, L1 an L2 represent left-eye images and may have the same value and R1 and R2 represent right-eye images and may have the same value. In FIG. 7, figures written beside L1, L2, R1, and R2 represent a length of one frame as a time in which the corresponding data is maintained. A square waveform is shown below Input DAT (a), Input DAT (b), DAT (a), DAT(b), DAT(c), and DAT(d) and the waveform represents a synchronization signal LR sync for distinguishing the left-eye image and the right-eye image. When the corresponding synchronization signal is high, the waveform represents the left-eye image. When the corresponding synchronization signal is low, the waveform represents the right-eye image.

In FIG. 7, two types of input data Input DAT inputted into the signal processor 600 are shown. In the Input DAT (a) of FIG. 7, the input data Input DAT inputted at 240 Hz (four times higher than the base frequency) is shown. As a result, in the input data Input DAT of the input DAT (a) of FIG. 7, the left-eye images are shown as L1 and L2 and the right-eye images are shown as R1 and R2.

The input data Input DAT may be 120 Hz (twice as high as the base frequency) and the left-eye images, L1 and L2 are inputted as one L1 and the right-eye images R1 and R2 are inputted as one R1 (see Input DAT (b) of FIG. 7).

When one of two types of input data Input DAT shown in FIG. 7 is inputted, the signal processor 600 of the 3D image display device, according to exemplary embodiments of the present invention, changes the operational frequency to a 3D frequency based on the one inputted input data and rearranges the input data Input DAT to generate one of the four image data DAT (a), (b), (c), and (d) shown in FIG. 7.

Among the four image data DAT shown in FIG. 7, two image data (a) and (b) correspond to the 3D frequency of 360 Hz (six times higher than the base frequency) and the rest of two image data DAT (c) and (d) correspond to the 3D frequency at 480 Hz (eight times higher than the base frequency).

The image data DAT (a) corresponding to the 3D frequency at 360 Hz has a 3D image signal group of LLLRRR. When the image data DAT (a) has the 3D image signal group, a crosstalk may occur because the black image B is not inserted. The crosstalk may be removed by setting the on/off cycle of the lens of the 3D glasses 100 differently from FIG. 1 to prevent the crosstalk. The data driver 500 can allow an image such as LLBRRB to be displayed on the liquid crystal display panel 310 by replacing L and R with the black data voltage. The left-eye input data include two types of L1 and L2, but only the data L1 is used twice. The right-eye input data include two types of R1 and R2, but only the data R1 is used twice. However, other arrangements may be practiced according to other exemplary embodiments of the present invention.

The image data DAT (b) corresponding to the 3D frequency at 360 Hz has a 3D image signal group of LLBRRB. The left-eye input data include two types of L1 and L2, but only the data L1 is used twice. The right-eye input data include two types of R1 and R2, but only the data R1 is used twice. However, other arrangements may be practiced according to other exemplary embodiments of the present invention.

The image data DAT (c) corresponding to the 3D frequency at 480 Hz has a 3D image signal group of LLLLRRRR. When the image data DAT (c) has the 3D image signal group, a crosstalk may occur because the black image B is not inserted. The crosstalk may be removed by setting the on/off cycle of the lens of the 3D glasses 100 differently from FIG. 1 to prevent the crosstalk. The data driver 500 can allow an image such as LLLBRRRB to be displayed on the liquid crystal display panel 310 by replacing L and R with the black data voltage. The left-eye input data include two types of L1 and L2, but only the data L1 is used twice. The right-eye input data include two types of R1 and R2, but only the data R1 is used twice. However, other arrangements may be practiced according to other exemplary embodiments of the present invention.

The image data DAT (d) corresponding to the 3D frequency at 480 Hz has a 3D image signal group of LLLBRRRB. The left-eye input data include two types of L1 and L2, but only the data L1 is used twice. The right-eye input data include two types of R1 and R2, but only the data R1 is used twice. However, other arrangements may be practiced according to other exemplary embodiments of the present invention.

As shown in DAT (c) and DAT (d) of FIG. 7, at 480 Hz, one frame is maintained for 2.08 ms and has 1 H of approximately 1.85 μs. The sufficient effective charge time is not obtained only with 1 H, but since the left-eye data voltage or the right-eye data voltage having the same polarity is applied consecutively throughout at least three frames, the effective charge time of approximately 5.55 μs is obtained. Since the effective charge time is much longer than 3.7 μs, which is the effective charge time at the 2D frequency of 240 Hz, an insufficient charging problem does not occur.

Since the data voltage is delayed as shown in FIG. 4, a reference data delay value acquired by dividing the total data delay value generated in the last gate line by the total number of gate lines is calculated and an application time of each gate-on voltage is increased by the reference data delay value to be applied to each gate line, thereby solving the delay of the data voltage.

In addition, the gate voltage is delayed as shown in FIG. 5 and since at least three frames are consecutive to obtain the sufficient effective charge time of approximately 5.5 μs, the gate delay value has a sufficient margin such that the problem of insufficient charge does not occur.

When the total gate delay value is 0.8 μs as described above, the effective charge time during one frame becomes 1.85 μs–0.8 μs=1.05 μs, in driving at 480 Hz. However, since the left-eye data voltage or the right-eye data voltage having the same polarity is applied repeatedly at least three times, the effective charge time is 1.05 μs*3, i.e., 3.15 μs, in the 3D mode at 480 Hz, which is larger than 2.9 μs (=3.7-0.8 μs) which is the effective charge time at 240 Hz due to the gate delay. As a result, according to an exemplary embodiment of the present invention, the gate delay value may have a sufficient margin.

As described above, the image data DAT corresponding to the 3D frequency is rearranged in the signal processor 600. In some exemplary embodiments of the present invention, the image data DAT is rearranged in the FRC unit 650 of FIG. 6 and thereafter, may be transferred to the signal processor.

According to an exemplary embodiment of the present invention, when the liquid crystal display panel 310 normally operates at 240 Hz (four times higher than the base frequency) to display the 2D image, the left-eye data voltage or the right-eye data voltage having the same polarity is applied consecutively at least twice at 360 Hz. The left-eye data voltage or the right-eye data voltage having the same polarity is applied consecutively at least three times at 480 Hz. The charge rate is accordingly compensated for without adding a component or otherwise changing the structure of the liquid crystal display panel 310. According to exemplary embodiment of the present invention, the delay of the data voltage is compensated by applying the gate-on voltage for the compensation gate-on application time and the delay of the gate voltage has a sufficient margin by applying the gate-on voltage consecutively twice or three times.

Hereinafter, a driving method of a 3D image display device according to an exemplary embodiment of the present invention will be described with reference to FIG. 8.

Figure 8:
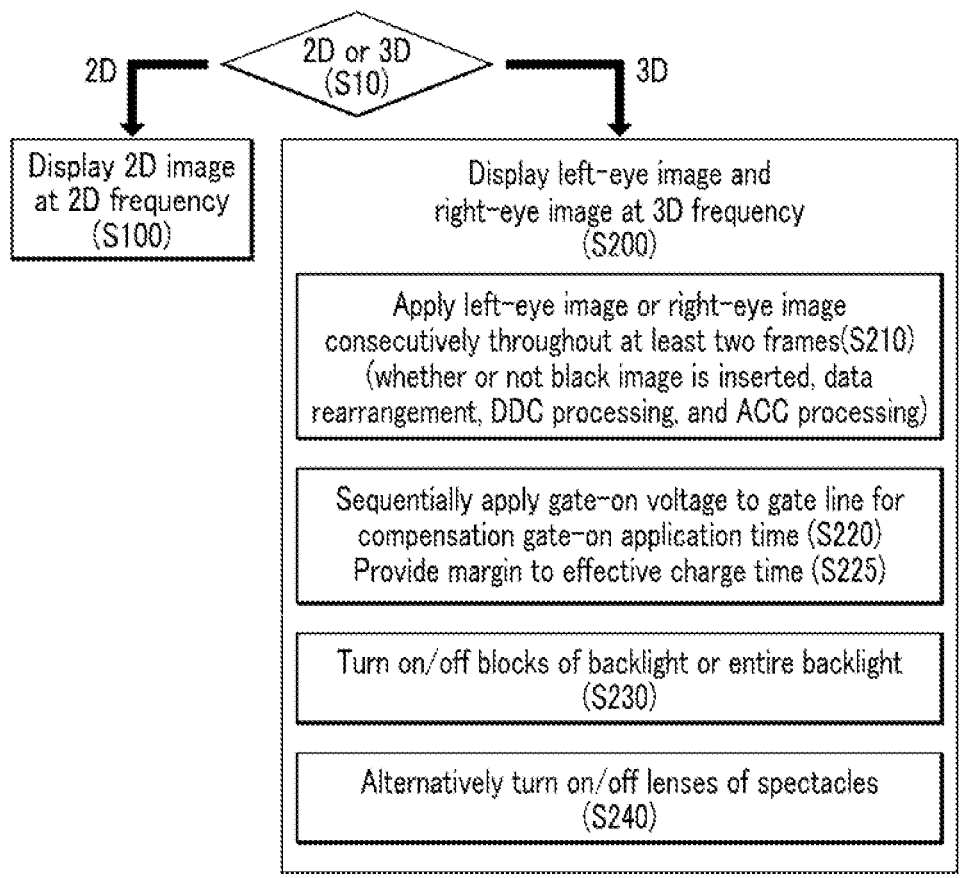
FIG. 8 is a flowchart showing a driving method of a 3D image display device according to an exemplary embodiment of the present invention.

FIG. 8 is a flowchart showing a driving method of a 3D image display device according to an exemplary embodiment of the present invention.

The 3D image display device according to an exemplary embodiment of the present invention judges whether to display an image in a 2D mode or in a 3D mode when an external image signal is inputted from the outside (Step S10).

When the image is displayed in the 2D mode, a 2D image is displayed at a 2D frequency such as 120 Hz or 240 Hz which is twice or four times higher than a base frequency (Step S100). The 2D image may be displayed using various methods known by those skilled in the art.

When the image is displayed in the 3D mode, a left-eye image and a right-eye image are separately displayed at a 3D frequency (Step S200).

In the 3D mode, various steps shown in FIG. 8 have a predetermined relationship to display the image. However, according to some exemplary embodiments, no predetermined relationship to display the image exists.

In the 3D image display device according to an exemplary embodiment of the present invention, the frequency in the 3D mode (3D frequency) is different from the 2D frequency and may be six times or eight times higher than the base frequency. The 3D mode may also have a frequency which is 1.5 times to four times higher than the 2D frequency.

In the 3D image display device according to an exemplary embodiment of the present invention, the left-eye image and the right-eye image are applied consecutively in at least two frames (Step S210). Accordingly, at 360 Hz, the left-eye image and the right-eye image are applied consecutively twice and the black image is inserted once or applied consecutively three times. At 480 Hz, the left-eye image and the right-eye image are applied consecutively three times and the black image is inserted once or applied consecutively four times. As described above, since the images have an arrangement different from input image data, a signal processor 600 may rearrange the input image data and may perform DCC processing or ACC processing together with the rearrangement. The image data may be temporarily stored by using a frame memory in rearrangement and the image data may be compressed and stored to reduce a storage capacity. In addition, a lookup table may be used in the DCC processing or ACC processing. An FRC unit 650 receives an external image signal and rearranges the received external image signal. The signal processor 600 may perform the DCC processing or ACC processing except for the rearrangement.

To compensate for a delay of a data voltage or a delay of a gate voltage generated in a liquid crystal display panel 310, step S220 or S225 may be performed.

Step S220 in which the delay of the data voltage is compensated is described. As described in FIG. 4, an application timing of a gate-on voltage is sequentially delayed by sequentially applying a gate-on voltage for a compensation gate-on application time. The compensation gate-on time is calculated based on a total data delay value to apply the gate-on voltage according to the delay of the data voltage.

Step S225 in which the delay of the gate voltage is compensated is described. When the number of frames in which the left-eye image or the right-eye image is consecutively applied is x, a margin is provided and a time acquired by multiplying a time acquired by subtracting a total gate delay value from an effective charge time by x is larger than a time acquired by subtracting the total gate delay value from the effective charge time in the 2D mode, in one frame, such that the delay of the gate voltage is compensated (see FIG. 5). The margin may not be additionally provided when the liquid crystal display panel itself has a sufficient margin.

Since two steps S220 and S225 need only be applied when a problem occurs due to the delay according to a characteristic of the panel, only one of two steps may be applied or both of two steps may be omitted.

In the 3D image display device according to an exemplary embodiment of the present invention, a backlight may be turned on/off and as shown in FIG. 1. The backlight is divided into blocks and an LED (may be other light sources other than the LED) corresponding to the corresponding block may be turned on/off or the entire backlight may be turned on/off (Step S230).

Since the left-eye image should be applied to only a left eye and the right-eye image should be applied to only a right eye, lenses of the 3D glasses 100 are turned on/off in synchronization with the 3D image display device (Step S240).

While exemplary embodiments of the present invention have been described in connection with the figures, it is to be understood that the invention is not limited to the disclosed embodiments.

What is claimed is:

1. A driving method of a 3D image display device, comprising:
   determining whether a display device is operating in a 2D mode for displaying only two-dimensional images or a 3D mode for displaying three-dimensional images;
   displaying an image at a predetermined 2D display frequency when it has been determined that the display device is operating in the 2D mode; and
   displaying a left-eye image and a right-eye image at a predetermined 3D display frequency higher than the 2D display frequency when it has been determined that the display device is operating in the 3D mode, wherein the displaying of the left-eye image and the right-eye image includes:
   applying data voltages representing the left-eye image or the right-eye image to a data line, the data voltages applied to the same pixel having an identical polarity and an identical magnitude throughout at least two consecutive frames; and
   sequentially applying a gate-on voltage to a plurality of gate lines crossing the data line at an interval of a compensation gate-on application time that is calculated based on a total data delay value,
   wherein when the left-eye image or the right-eye image is consecutively applied for x number of frames, a margin is provided such that a third time acquired by multiplying a second time acquired by subtracting a total gate delay value from an effective charge time in the 3D mode by x is larger than a first time acquired by subtracting the total gate delay value from an effective charge time in the 2D mode.

2. The method of claim 1, wherein: the compensation gate-on application time is determined by dividing the total data delay value by the number of gate lines within the plurality of gate lines to determine a reference data delay value, and adding the determined reference data delay value to a single horizontal period 1 H.

3. The method of claim 2, wherein: the 3D display frequency is four times greater than the 2D display frequency.

4. The method of claim 3, wherein: the 3D image signal group is divided into a left-eye image group and a right-eye image group and a black image is included in a last frame of the left-eye image group and a last frame of the right-eye image group.

5. The method of claim 4, wherein:
   the gate-on voltage is applied for a first length of time in the frame in which the black image is applied;
   the gate-on voltage is applied for a second length of time in the frame in which the left-eye image and the right-eye image are applied; and
   the first length of time is twice as long as the second length of time.

6. The method of claim 5, wherein: the 3D image display device includes a signal processor, a data driver, a gate driver, a liquid crystal display panel, a backlight positioned on a rear surface of the liquid crystal display panel, and 3D glasses, and the displaying of the left-eye image and the right-eye image further includes generating image data acquired by rearranging input image data input into the signal processor into a form that can be displayed at the 3D display frequency and outputting the generated image data to the data driver.

7. The method of claim 6, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

8. The method of claim 7, wherein: the signal processor performs dynamic capacitance compensation (DCC) processing of the inputted input image data in addition to the rearrangement processing and thereafter, generates the image data.

9. The method of claim 1, wherein: the 3D display frequency is four times higher than the 2D display frequency.

10. The method of claim 9, wherein: the 3D image signal group is divided into a left-eye image group and a right-eye image group and a black image is included in a last frame of the left-eye image group and a last frame of the right-eye image group.

11. The method of claim 10, wherein:
the gate-on voltage is applied for a first length of time in the frame in which the black image is applied;
the gate-on voltage is applied for a second length of time in the frame in which the left-eye image and the right-eye image are applied; and
the first length of time is twice as long as the second length of time.

12. The method of claim 11, wherein: the 3D image display device includes a signal processor, a data driver, a gate driver, a liquid crystal display panel, a backlight positioned on a rear surface of the liquid crystal display panel, and 3D glasses, and the displaying of the left-eye image and the right-eye image further includes generating image data acquired by rearranging input image data input into the signal processor into a form that can be displayed at the 3D display frequency and outputting the generated image data to the data driver.

13. The method of claim 12, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

14. The method of claim 13, wherein: the signal processor performs dynamic capacitance compensation (DCC) processing of the inputted input image data in addition to the rearrangement processing and thereafter, generates the image data.

15. The method of claim 1, wherein: the 3D image signal group is divided into a left-eye image group and a right-eye image group and a black image is included in a last frame of the left-eye image group and a last frame of the right-eye image group.

16. The method of claim 15, wherein:
the gate-on voltage is applied for a first length of time in the frame in which the black image is applied;
the gate-on voltage is applied for a second length of time in the frame in which the left-eye image and the right-eye image are applied; and
the first length of time is twice as long as the second length of time.

17. The method of claim 16, wherein: the 3D image display device includes a signal processor, a data driver, a gate driver, a liquid crystal display panel, a backlight positioned on a rear surface of the liquid crystal display panel, and 3D glasses, and the displaying of the left-eye image and the right-eye image further includes generating image data acquired by rearranging input image data input into the signal processor into a form that can be displayed at the 3D display frequency and outputting the generated image data to the data driver.

18. The method of claim 17, wherein: the left-eye image and the right-eye image are rearranged as one of the following arrangements; LLLRRR, LLBRRB, LLLLRRRR, or LLLBRRRB; wherein L represents the left-eye image, R represents the right-eye image, and B represents the black image.

19. The method of claim 18, wherein: the signal processor performs dynamic capacitance compensation (DCC) processing of the inputted input image data in addition to the rearrangement processing and thereafter, generates the image data.

20. The method of claim 1, wherein: the 3D image display device includes a signal processor, a data driver, a gate driver, a liquid crystal display panel, a backlight positioned on a rear surface of the liquid crystal display panel, and 3D glasses, and the displaying of the left-eye image and the right-eye image further includes generating image data acquired by rearranging input image data input into the signal processor into a form that can be displayed at the 3D display frequency and outputting the generated image data to the data driver.

21. The method of claim 20, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

22. The method of claim 21, wherein: the signal processor performs dynamic capacitance compensation (DCC) processing of the input image data in addition to the rearrangement processing and thereafter, generates the image data.

23. The method of claim 1, wherein: the 3D image display device includes a liquid crystal display panel and a backlight positioned on a rear surface of the liquid crystal display panel, and the displaying of the left-eye image and the right-eye image further includes:
dividing the liquid crystal display panel into a plurality of blocks; and
turning on or off selected parts of the backlight corresponding to the plurality of blocks.

24. The method of claim 1, further comprising: the 3D image display device further includes 3D glasses synchronized with the 3D image display device, turning on/off lenses of the 3D glasses according to a signal of the 3D image display device.

25. The method of claim 1, wherein: the 3D image display device includes a frame rate conversion (FRC) unit, a signal processor, a data driver, a gate driver, a liquid crystal display panel, a backlight positioned on a rear surface of the liquid crystal display panel, and 3D glasses, and the displaying of the left-eye image and the right-eye image further includes receiving an external image signal inputted into the FRC unit and rearranging the received image signal as one of the following arrangements to transfer one arrangement to the signal processor; LLLRRR, LLBRRB, LLLLRRRR, or LLLBRRRB, wherein L represents the left-eye image, R represents the right-eye image, and B represents the black image.

26. A 3D image display device having a 2D mode for displaying only two-dimensional images and a 3D mode for displaying three-dimensional images, the display device including a signal processor, a data driver, a gate driver, and a liquid crystal display panel, wherein: a predetermined 2D display frequency for displaying an image in the 2D mode is lower than a 3D display frequency for displaying an image in the 3D mode, the signal processor transfers image data to the data driver and applies the left-eye image or the right-eye image to a data line of the liquid crystal display panel with identical polarity throughout at least two consecutive frames, and the signal processor controls the gate driver such that a gate-on voltage is sequentially applied to a plurality of gate lines crossing the data line at an interval of a compensation gate-on application time that is calculated based on a total data delay value in which a data voltage is delayed along the data line, wherein when the left-eye image or the right-eye image is consecutively applied for x number of frames, and a margin is provided for a length of time required to ensure that a second time acquired by subtracting a total gate delay value from an effective charge time and multiplying the result of the subtraction by x, in the 3D mode, is larger than a first time acquired by subtracting the total gate delay value from the effective charge time, in the 2D mode.

27. The 3D image display device of claim 26, wherein: the compensation gate-on application time is determined by dividing the total data delay value by the number of gate lines within the plurality of gate lines to determine a reference data delay value, and adding the determined reference data delay value to a single horizontal period 1 H.

28. The 3D image display device of claim 27, wherein: the 3D display frequency is four times higher than the 2D display frequency.

29. The 3D image display device of claim 28, wherein: the 3D image signal group is divided into a left-eye image group and a right-eye image group and a black image is included in a last frame of the left-eye image group and a last frame of the right-eye image group.

30. The 3D image display device of claim 29, wherein:
the gate-on voltage is applied for a first length of time in the frame in which the black image is applied;
the gate-on voltage is applied for a second length of time in the frame in which the left-eye image and the right-eye image are applied; and
the first length of time is twice as long as the second length of time.

31. The 3D image display device of claim 30, wherein: the signal processor further includes a frame memory, and the signal processor stores input image data in the frame memory and generates image data rearranged into a form that can be displayed at the 3D display frequency to output the generated image data to the data driver.

32. The 3D image display device of claim 31, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

33. The 3D image display device of claim 32, wherein: the signal processor performs dynamic capacitance compensation (DCC) processing of the input image data in addition to the rearrangement processing.

34. The 3D image display device of claim 26, wherein: the 3D display frequency is four times higher than the 2D display frequency.

35. The 3D image display device of claim 34, wherein: 3D image signal group is divided into a left-eye image group and a right-eye image group and a black image is included in a last frame of the left-eye image group and a last frame of the right-eye image group.

36. The 3D image display device of claim 35, wherein: the gate-on voltage is applied for a first length of time in the frame in which the black image is applied; the gate-on voltage is applied for a second length of time in the frame in which the left-eye image and the right-eye image are applied; and the first length of time is twice as long as the second length of time.

37. The 3D image display device of claim 36, wherein: the signal processor further includes a frame memory, and the signal processor stores input image data in the frame memory and generates image data rearranged into a form that can be displayed at the 3D display frequency to output the generated image data to the data driver.

38. The 3D image display device of claim 37, wherein: the left-eye image and the right-eye image are rearranged as one of the following arrangements; LLLRRR, LLBRRB, LLLLRRRR, or LLLBRRRB wherein L represents the left-eye image, R represents the right-eye image, and B represents the black image.

39. The 3D image display device of claim 38, wherein: the signal processor performs dynamic capacitance compensation (DCC) processing of the inputted input image data in addition to the rearrangement processing.

40. The 3D image display device of claim 26, wherein: the 3D image signal group is divided into a left-eye image group and a right-eye image group and a black image is included in a last frame of the left-eye image group and a last frame of the right-eye image group.

41. The 3D image display device of claim 40, wherein:
the gate-on voltage is applied for a first length of time in the frame in which the black image is applied; the gate-on voltage is applied for a second length of time in the frame in which the left-eye image and the right-eye image are applied; and
the first length of time is twice as long as the second length of time.

42. The 3D image display device of claim 41, wherein: the signal processor further includes a frame memory, and the signal processor stores input image data in the frame memory and generates image data rearranged into a form that can be displayed at the 3D display frequency to output the generated image data to the data driver.

43. The 3D image display device of claim 42, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

44. The 3D image display device of claim 43, wherein: the signal processor performs dynamic capacitance compensation (DCC) processing of the inputted input image data in addition to the rearrangement processing.

45. The 3D image display device of claim 26, wherein: the signal processor further includes a frame memory, and the signal processor stores input image data in the frame memory and generates image data rearranged into a form that can be displayed at the 3D display frequency to output the generated image data to the data driver.

46. The 3D image display device of claim 45, wherein: the left-eye image and the right-eye image are rearranged as one of the following arrangements; LLLRRR, LLBRRB, LLLLRRRR, or LLLBRRRB, wherein L represents the left-eye image, R represents the right-eye image, and B represents the black image.

47. The 3D image display device of claim 46, wherein: the signal processor performs dynamic capacitance compensation (DCC) processing of the inputted input image data in addition to the rearrangement processing.

48. The 3D image display device of claim 26, further comprising: a backlight positioned on a rear surface of the liquid crystal display panel and including a light source, and the light source of the backlight is divided into predetermined blocks and the blocks are turned on or off.

49. The 3D image display device of claim 26, further comprising: 3D glasses synchronized with the 3D image display device, and wherein lenses of the 3D glasses are turned on/off according to a signal of the 3D image display device.

50. The 3D image display device of claim 26, further comprising: a frame rate conversion (FRC unit), wherein the FRC unit receives an external image signal inputted from the outside and rearranges the received image signal as one of the following arrangements to transfer one arrangement to the signal processor; LLLRRR, LLBRRB, LLLLRRRR, or LLL-BRRRB, wherein L represents the left-eye image, R represents the right-eye image, and B represents the black image.

51. A method for driving a display device, comprising:
   determining whether a display device is operating in a 2D mode for displaying only two-dimensional images or a 3D mode for displaying three-dimensional images;
   displaying a 2D image at a predetermined 2D display frequency when it has been determined that the display device is operating in the 2D mode; and
   displaying a 3D image at a predetermined 3D display frequency that is a multiple of the 2D display frequency when it has been determined that the display device is operating in the 3D mode,
   wherein the displaying the 3D image includes:
      applying a first data voltage representing a left-eye image or a right-eye of the 3D image to a data line;
      applying a second data voltage applied to the same pixel having an identical polarity and magnitude of the first data voltage to the data line in a consecutive frame; and
      sequentially applying a gate-on voltage to a plurality of gate lines crossing the data line at an interval of a compensation gate-on application time that is calculated based on a total data delay value,
   wherein when the left-eye image or the right-eye image is consecutively applied for x number of frames, a margin is provided such that a third time acquired by multiplying a second time acquired by subtracting a total gate delay value from an effective charge time in the 3D mode by x is larger than a first time acquired by subtracting the total gate delay value from an effective charge time in the 2D mode.

* * * * *